United States Patent Office 2,925,348
Patented Feb. 16, 1960

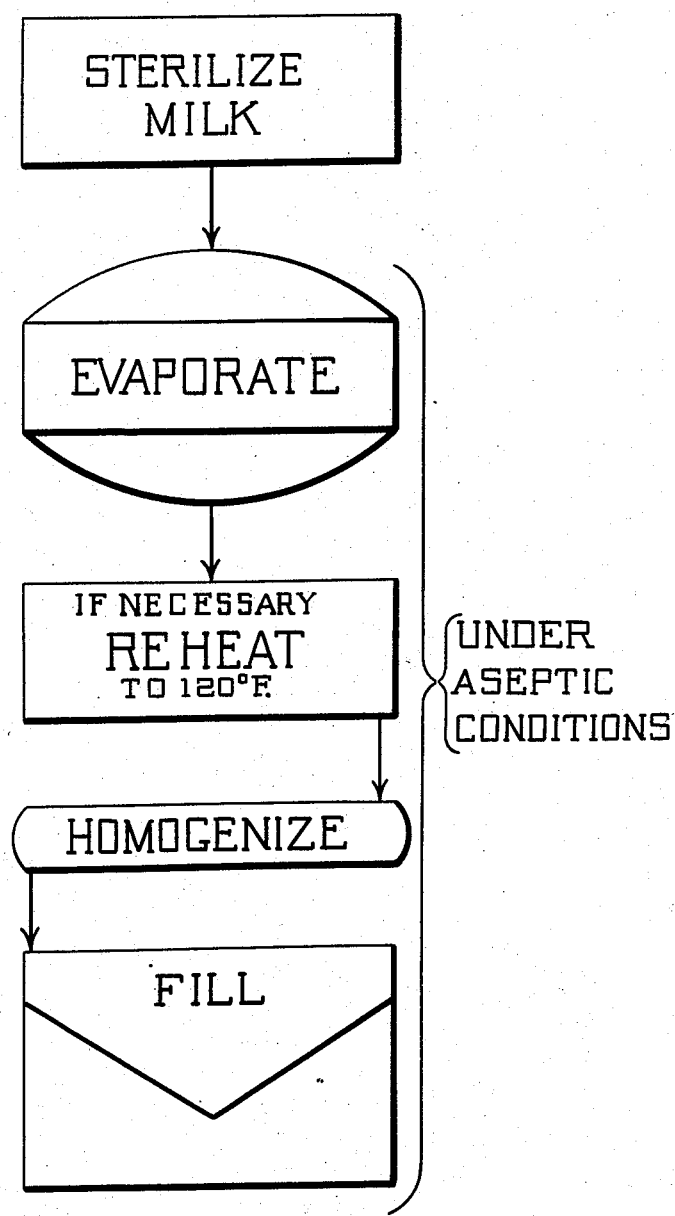

2,925,348
PROCESS OF MAKING STERILE CONCENTRATED MILK

John M. Boyd, Chicago, Ill., assignor to Continental Can Company, Inc., New York, N.Y., a corporation of New York Application August 4, 1955, Serial No. 526,426

1 Claim. (Cl. 99—184)

The invention to which the following specification relates, is of an improved sterile concentrated milk and the process for producing it.

Milk in concentrated, liquid form is widely known and prepared in numerous ways. For beverage use it is usually diluted to approximately the composition of normal whole milk. There has been previous difficulty, however, in the manufacture of such a product. In the first place, the properties of the product are noticeably changed in respect to viscosity, loss of natural flavor, and graininess. Moreover, it is difficult to preserve, and has a dark color. Previous forms of concentration and sterilization tend to promote the separation of the butterfat and to precipitate the protein.

It is an object of my invention to sterilize the milk as an initial step and while it is still dilute. Under such conditions the heat of sterilization can be applied and withdrawn so rapidly as not to caramelize the material or induce a graininess from a change in the proteins.

Another object of my invention is thus to prevent the separation of butterfat which is apt to occur when sterilization follows concentration and homogenization.

An incidental object of my invention is to insure lower viscosity and retain the normal color of whole milk.

A still further object of my invention is to protect the milk from such changes as would prevent the reconstitution of the concentrated milk into a dilute product closely resembling fluid whole milk and maintaining the flavor of the latter.

Briefly described, the invention consists in sterilizing the whole milk as a preliminary step and following this by successive evaporation, homogenizing and canning under aseptic conditions. This avoids the necessity of carrying out the sterilizing step after the milk has been concentrated and homogenized.

The attached flow-sheet illustrates the characteristic features of the invention.

Homogenization following concentration and sterilization has been found to produce a finer dispersion of the fat in the canned product. This aids materially in preserving the desirable physical properties and permits longer shelf-life before fat separation reaches an objectionable level. Expressed another way, the homogenization is a purely physical treatment which should follow all of the steps in which the undesirable characteristics of high viscosity, cooked flavor and graininess can develop.

In carrying out the operation under this invention, and as illustrated on the attached flow-sheet, the raw milk is first sterilized by heat. The milk in thin sheets or like accessible quantities is subjected to a flash sterilization which may be as much as five minutes at 250° F., or six seconds at 300° F.

By sterilizing the dilute milk, the heat is transmitted more quickly and heat induced chemical and physical reactions responsible for color changes and protein coagulation minimized.

The hot milk is then led into the evaporator without being subjected to contamination of the air or non-sterile vessels. Evaporation is carried out under less than atmospheric pressure, so that the effect is produced rapidly and without subjecting the milk to undue heat.

The concentration is carried to the point where the milk is reduced to as much as one third of its original volume.

Under some conditions of evaporation, the milk may be discharged from the evaporator at a temperature too low for effective homogenization and thus require additional heating. If heating is necessary it is carried out in the next step, also without disturbing the aseptic conditions of operation. The heating is carried to approximately 120° F. or higher. It will be appreciated, however, that the requirement of re-heating subsequent to evaporation may be obviated or minimized by maintaining the sterile milk at a temperature sufficiently high during evaporation that the milk, upon leaving the evaporator, will be at a temperature of at least 120° F.

Finally, the sterile, evaporated or concentrated milk at a temperature conducive to homogenization is led through a homogenizer. This again is accomplished without loss of the aseptic conditions.

The concentrated milk from the homogenizer may be cooled before filling, or led directly to a filling machine where the product is placed in sterile metal cans and sealed. Other air-tight receptacles can be used.

The significant feature here is that since the material has been treated under aseptic conditions from the initial sterilization through the final steps of filling and sealing, no more sterilization is needed. This avoids damage by heat and consequent change in color or physical texture.

In one example, the fluid whole milk was raised to a temperature of 250° F. and held there for five minutes to accomplish sterilization.

The milk was run into the evaporator without exposure to the air or other contaminating conditions. The evaporator is preferably of the falling film type, although an equivalent vacuum pan is illustrated on the flow-sheet. Here the milk was subjected to reduced pressure and the temperature not exceeding 140° F. The evaporation was continued until the milk was reduced to substantially one third of the original volume.

In the event that the temperature should drop below 120° F., the milk on withdrawal from the evaporator is raised to at least this temperature and immediately homogenized and then filled into sterile containers and sealed.

By mtaintaining aseptic conditions from the time the milk was sterilized and through the successive steps of evaporation, reheating, homogenization and filling, no subsequent sterilization was found to be necessary.

The resulting sterile, concentrated milk will stand for a longer period without separation of butterfat or development of graininess from protein coagulation. Such a concentrated product compares favorably with the viscosity of the ordinary evaporated milk of substantially one half the bulk of raw milk.

When this improved product is diluted with water to the original volume, the milk is free from caramel or cooked flavor, the viscosity is normal, and there is an absence of graininess. Its color also approximates that of the original raw milk.

In a second example, the raw milk was raised to a temperature of 300° F. in the sterilization step. The time required to bring the milk up to this temperature was approximately six seconds. The milk was then immediately reduced in temperature as sterilization did not require maintaining the temperature at the peak for any definite period.

The subsequent operations were the same as those in the first example. The physical properties were observed to be the same.

For the purpose of illustration and by way of example I have described the preferred manner or mode of carrying out this invention. However, changes in temperatures and times of the operational steps can be made without departing from the invention as described in the following claim.

What I claim is:

The process of concentrating whole milk to substantially one-third of its original volume, which consists in sterilizing by flash heating the whole milk by bringing its temperature up to a range of from 250° F. for five minutes to 300° F. momentarily, evaporating the milk under reduced pressure and under aseptic conditions at less than 140° F. to as much as one-third of its original volume, bringing the milk to at least approximately 120° F., homogenizing the heated milk, cooling the milk and filling the concentrated sterile milk all under aseptic conditions into sterilized containers and sealing the containers while under aseptic conditions and without further heat treatment.

References Cited in the file of this patent

UNITED STATES PATENTS

| | | |
|---|---|---|
| Re. 19,193 | Grindrod | June 5, 1934 |
| 1,964,279 | Webb | June 26, 1934 |
| 2,049,591 | Rafn | Aug. 4, 1936 |